US011350507B2

(12) United States Patent
Kuta et al.

(10) Patent No.: US 11,350,507 B2
(45) Date of Patent: May 31, 2022

(54) PORTABLE LIGHTING DEVICE WITH RAMP-DOWN CAPABILITY

(71) Applicant: MILWAUKEE ELECTRIC TOOL CORPORATION, Brookfield, WI (US)

(72) Inventors: Jonathan J. Kuta, Milwaukee, WI (US); Gary Lee McMurray, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/076,286

(22) Filed: Oct. 21, 2020

(65) Prior Publication Data

US 2021/0120652 A1    Apr. 22, 2021

Related U.S. Application Data

(60) Provisional application No. 62/923,866, filed on Oct. 21, 2019.

(51) Int. Cl.
    *H05B 47/11*    (2020.01)
    *H05B 47/17*    (2020.01)
    (Continued)

(52) U.S. Cl.
    CPC .............. *H05B 47/11* (2020.01); *F21L 4/005* (2013.01); *F21V 33/0008* (2013.01); *H05B 45/12* (2020.01); *H05B 47/17* (2020.01)

(58) Field of Classification Search
    CPC ........ H05B 47/11; H05B 47/17; H05B 45/12; H05B 47/16; H05B 45/10; H05B 33/08;
    (Continued)

(56) References Cited

U.S. PATENT DOCUMENTS 6,362,578 B1    3/2002   Swanson et al.
6,836,081 B2   12/2004   Swanson et al.
(Continued)

FOREIGN PATENT DOCUMENTS

DE    102015009097 A1    1/2017
JP       2011529249 A   12/2011

OTHER PUBLICATIONS

International Search Report and Written Opinion for Application No. PCT/US2020/056634 dated Feb. 10, 2021 (7 pages).

*Primary Examiner* — Daniel D Chang
(74) *Attorney, Agent, or Firm* — Michael Best & Friedrich LLP (57) ABSTRACT

A lighting device including a light source, one or more input devices, and an electronic processor. The electronic processor is configured to receive an input to illuminate the light source at a first illumination intensity value associated with a first operating mode and operate the light source at the first illumination intensity value based on the received input. The electronic processor is further configured to initiate a ramp-down operation of the light source from the first illumination intensity value. The electronic processor is further configured to receive a first mode change input to change from the first operation mode to a second operating mode at a first time, wherein a second illumination intensity value is associated with the second operating mode, and, in response to receiving the first mode change input, control the output of the light source to output a third illumination intensity value.

19 Claims, 8 Drawing Sheets

(51) Int. Cl.
*F21V 33/00* (2006.01)
*F21L 4/00* (2006.01)
*H05B 45/12* (2020.01)

(58) Field of Classification Search
CPC ... H05B 39/00; F21V 33/0008; F21V 21/084; F21L 4/005; F21L 4/00; H01J 1/62
See application file for complete search history.

(56) References Cited

U.S. PATENT DOCUMENTS

| | | |
|---|---|---|
| 7,015,654 B1 * | 3/2006 | Kuhlmann ............. H05B 45/38 315/291 |
| 7,812,550 B2 | 10/2010 | Harmgardt et al. |
| 8,004,210 B2 | 8/2011 | Harmgardt et al. |
| 8,033,677 B1 | 10/2011 | Olsson et al. |
| 8,282,250 B1 | 10/2012 | Dassanayake et al. |
| 8,297,791 B2 | 10/2012 | Kuang et al. |
| 8,400,061 B2 | 3/2013 | Kuang et al. |
| 8,632,230 B2 | 1/2014 | Olsson et al. |
| 8,786,191 B2 | 7/2014 | Kuang et al. |
| 8,933,632 B2 | 1/2015 | Panaccio |
| 8,979,304 B2 | 3/2015 | Mart et al. |
| 9,084,314 B2 | 7/2015 | Conover et al. |
| 9,096,168 B2 | 8/2015 | Kuang et al. |
| 9,215,775 B1 | 12/2015 | Lunn et al. |
| 9,388,973 B1 | 7/2016 | Olsson et al. |
| 9,414,460 B2 | 8/2016 | Bender et al. |
| 9,425,649 B2 | 8/2016 | Singer et al. |
| 9,591,711 B2 | 3/2017 | Lunn et al. |
| 9,608,479 B2 | 3/2017 | Singer et al. |
| 9,702,619 B2 | 7/2017 | Kendall et al. |
| 9,730,294 B2 | 8/2017 | Roberts |
| 9,756,693 B1 | 9/2017 | Klyn et al. |
| 9,839,093 B1 | 12/2017 | Blanchard et al. |
| 9,839,206 B2 | 12/2017 | Lawyer et al. |
| 9,955,540 B1 | 4/2018 | Blanchard |
| 10,078,055 B2 | 9/2018 | Nichols et al. |
| 10,230,262 B2 | 3/2019 | Singer et al. |
| 2009/0189548 A1 * | 7/2009 | Hoffman ................ H05B 45/10 315/307 |
| 2009/0323317 A1 | 12/2009 | Spartano et al. |
| 2010/0084997 A1 | 4/2010 | Oberzeir et al. |
| 2012/0112667 A1 | 5/2012 | Mohan et al. |
| 2015/0077016 A1 | 3/2015 | Panaccio |
| 2015/0158421 A1 | 6/2015 | Kuang et al. |
| 2016/0185288 A1 | 6/2016 | Kuang et al. |
| 2017/0050560 A1 | 2/2017 | Kuang et al. |
| 2017/0115052 A1 | 4/2017 | Kendall et al. |
| 2017/0359876 A1 | 12/2017 | Zhang et al. |
| 2018/0184628 A1 | 7/2018 | Lawyer et al. |
| 2018/0352630 A1 * | 12/2018 | Ueno .................. A61N 5/0618 |

* cited by examiner

PORTABLE LIGHTING DEVICE WITH RAMP-DOWN CAPABILITY

CROSS-REFERENCE TO RELATED APPLICATIONS

This application claims priority to, and the benefit of U.S. Provisional Patent Application No. 62/923,866, filed Oct. 21, 2019, the contents of which are incorporated herein by reference.

FIELD OF THE INVENTION

The present invention relates to lighting devices. More specifically, the present invention relates to portable lighting devices having adjustable light outputs.

SUMMARY

In one embodiment, the described technology provides a method for operating a light source. The method includes receiving an input to illuminate the light source at a first illumination intensity value associated with a first operating mode and operating the light source at the first illumination intensity value based on the received input. The method also includes initiating a ramp-down operation of the light source from the first illumination intensity value, wherein the ramp-down operation is configured to reduce an output of the light source as a percentage of a desired illumination intensity value over time. The method also includes receiving a first mode change input to change from the first operating mode to a second operating mode at a first time, wherein a second illumination intensity value is associated with the second operating mode, and, in response to receiving the first mode change input, controlling the output of the light source to output a third illumination intensity value, wherein the third illumination intensity value is equal to the second illumination intensity value less the percentage of the first illumination intensity value at the first time. The method further includes continuing the ramp-down operation from the third illumination intensity value.

The ramp-down operation of the above method includes continuing the ramp-down operation until the output of the light source reaches a predetermined value.

The ramp-down operation is further configured to reduce the output of the light source as a percentage of the desired illumination value over time, and determine if the output of the light source has reached a first predetermined value. The ramp-down operation, in response to determining that the output of the light source has reached the first predetermined value, maintains the output of the light source at the first predetermined value for a first time period. The ramp-down operation determines if the first time period has elapsed, and, in response to determining that the first time period has elapsed, reduces the output of the light source to a second predetermined value over time.

The above method may further include determining an operating time of the light source while operating the light source at the first illumination intensity value, wherein initiating the ramp-down operation includes initiating the ramp-down operation of the light source based on the operating time of the light source exceeding a predetermined time value.

The second illumination intensity value may be lower than the first illumination intensity value.

The above method may further include receiving a second mode change input to change to a third mode at a second time and, in response to receiving the second mode change input, controlling the output of the light source to output a fourth illumination intensity value. The fourth illumination intensity value is equal to the second illumination intensity value less the percentage of the third illumination value at the second time, wherein the third illumination value is lower than the second illumination intensity value.

The above method may further include operating the light source in the first operating mode when power to the light source is cycled.

The above method may further include operating the light source at an operating mode selected prior to a power cycling operation.

The above method may further include determining an intensity of the second illumination intensity value relative to the first illumination intensity value. In response to the second illumination intensity value being determined to be a lower intensity value than the first illumination intensity value, controlling the output of the light source to output the third illumination intensity value. In response to the second illumination intensity being determined to be a higher intensity value than the first illumination intensity value, controlling the output of the light source to output the second illumination intensity value.

The above method may further include determining an intensity of the second illumination intensity value relative to the first illumination intensity value. In response to the second illumination value being determined to be a lower intensity value than the first illumination intensity value, controlling the output of the light source to output the third illumination intensity value. In response to the second illumination intensity value being determined to be a higher intensity value than the first illumination intensity value, controlling the output of the light source to output a fourth intensity value, wherein the fourth illumination intensity value is equal to the second illumination intensity value less the percentage of the first illumination intensity value at the first time.

In one embodiment, a lighting device is disclosed. The lighting device includes a light source, one or more input devices, and an electronic processor. The electronic processor is configured to receive an input to illuminate the light source at a first illumination intensity value associated with a first operating mode and operate the light source at the first illumination intensity value based on the received input. The electronic processor is further configured to initiate a ramp-down operation of the light source from the first illumination intensity value, wherein the ramp-down operation is configured to reduce an output of the light source as a percentage of a desired illumination intensity value over time. The electronic processor is further configured to receive a first mode change input to change from the first operation mode to a second operating mode at a first time, wherein a second illumination intensity value is associated with the second operating mode, and, in response to the first mode change input, control the output of the light source to output a third illumination intensity value. The third illumination intensity value is equal to the second illumination intensity value less the percentage of the first illumination intensity value at the first time. The electronic processor is further configured to continue the ramp-down operation from the third illumination intensity value.

The electronic processor may also be configured to determine an intensity of the second illumination intensity value relative to the first illumination intensity value, control the output of the light source to output the third illumination intensity value in response to the second illumination intensity value being determined to be a lower intensity value than the first illumination intensity value. The electronic processor further configured to control the output of the light source to output the second illumination intensity value in response to the second illumination value being determined to be a higher intensity value than the first illumination intensity value.

The electronic processor may also be configured to determine an intensity of the second illumination intensity value relative to the first illumination intensity value. The electronic processor may also be configured to control the output of the light source to output the third illumination intensity value in response to the second illumination intensity value being determined to be a lower intensity value than the first illumination intensity value, and control the output of the light source to output a fourth intensity illumination value in response to the second illumination value being determined to be a higher intensity value than the first illumination intensity value, wherein the fourth illumination intensity value is equal to the second illumination intensity value less the percentage of the first illumination intensity value at the first time.

The electronic processor may be further configured to continue the ramp-down operation from the third illumination value until the ramp-down operation is complete.

The ramp-down operation is complete when the ramp-down operation reaches a predetermined value.

The electronic processor may further be configured to operate the light source at the operating mode of the light source immediately prior to a power cycling operation.

In another embodiment, a lighting device is disclosed. The lighting device include a light source, one or more input devices, and an electronic processor. The electronic processor is configured to receive an input from the one or more input devices to illuminate the light source at a first illumination intensity value associated with a first operating mode, and control the light source to output light at the first illumination intensity value based on the received input. The electronic processor is further configured to determine an operating time of the light source, and initiate a ramp-down operation of the light source based on the operating time of the light source being determined to exceed a predetermined time value, wherein the ramp-down operation is configured to reduce an output of the light source as a percentage of a desired illumination intensity value over time. The electronic processor is further configured to receive a first mode change input to change from the first operating mode to a second operating mode at a first time, wherein a second illumination intensity value is associated with the second operating mode, and wherein the second illumination intensity value is less than the first illumination intensity value. The electronic processor is further configured to control the output of the light source to output a third illumination intensity value, wherein the third illumination intensity value is equal to the second illumination intensity value less the percentage of the first illumination intensity value at the first time, and continuing the ramp-down operation from the third illumination intensity value until the ramp-down operation is complete.

The electronic processor is further configured to receive a second mode change input to change from the second operating mode to a third operating mode at a third time, wherein a fourth illumination intensity value is associated with the third operating mode.

The fourth illumination intensity value is a higher intensity value than the second illumination intensity value. The electronic processor is further configured to control the output of the light source to output a fifth illumination intensity value, wherein the fifth illumination intensity value is equal to the fourth illumination intensity value less a percentage of the second illumination intensity value at the second time.

The fourth illumination value is a higher intensity value than the second illumination intensity value. The electronic processor is further configured to control the output of the light source to output the fourth illumination intensity value.

DETAILED DESCRIPTION

Before any embodiments of the invention are explained in detail, it is to be understood that the application is not limited to the details of construction and the arrangement of components set forth in the following description or illustrated in the following drawings. The application is capable of other embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly to encompass both direct and indirect mountings, connections, supports, and couplings.

Figure 1A:
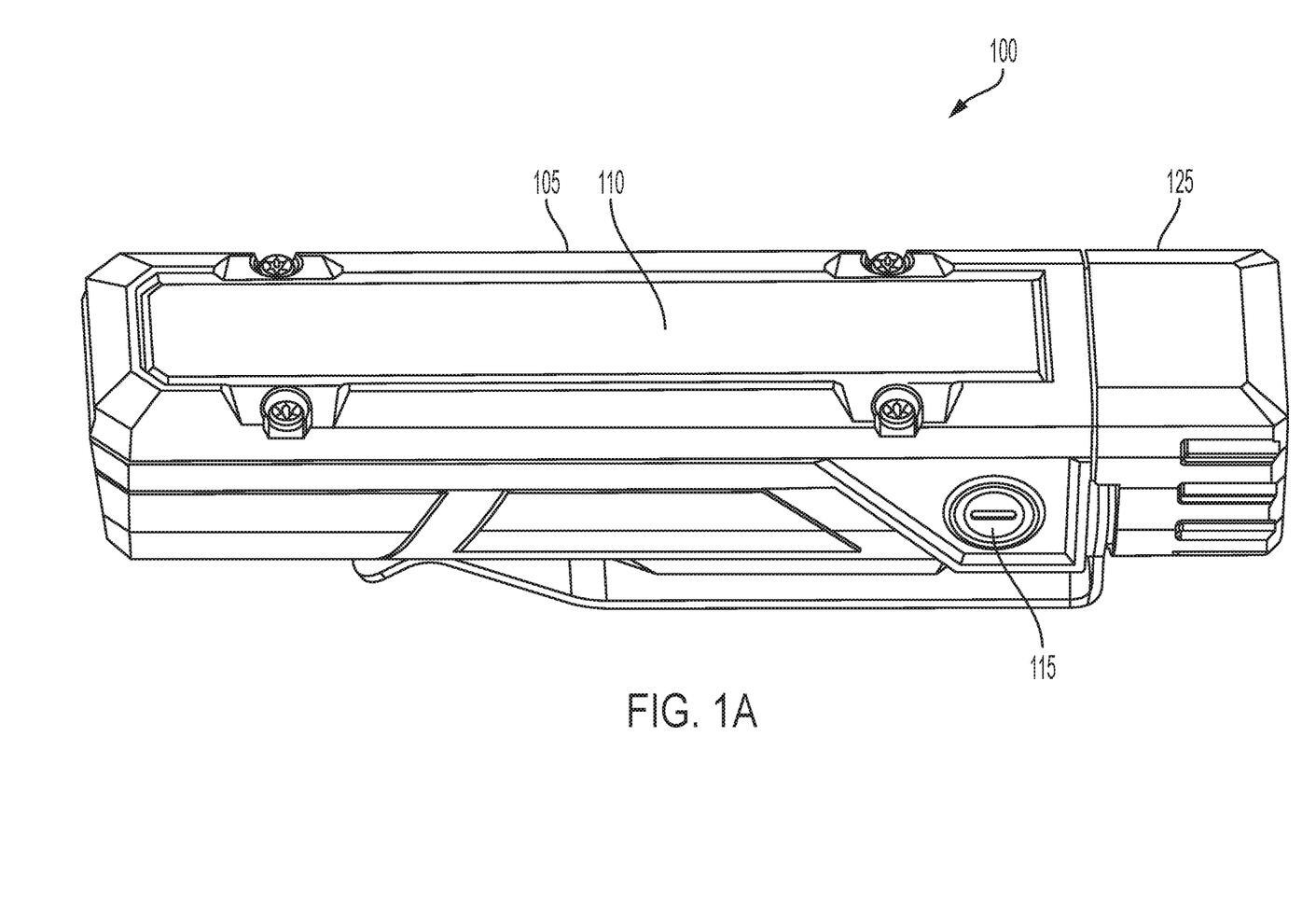
FIG. 1A is a perspective view of a portable lighting device including a light source, according to some embodiments.
Figure 1B:
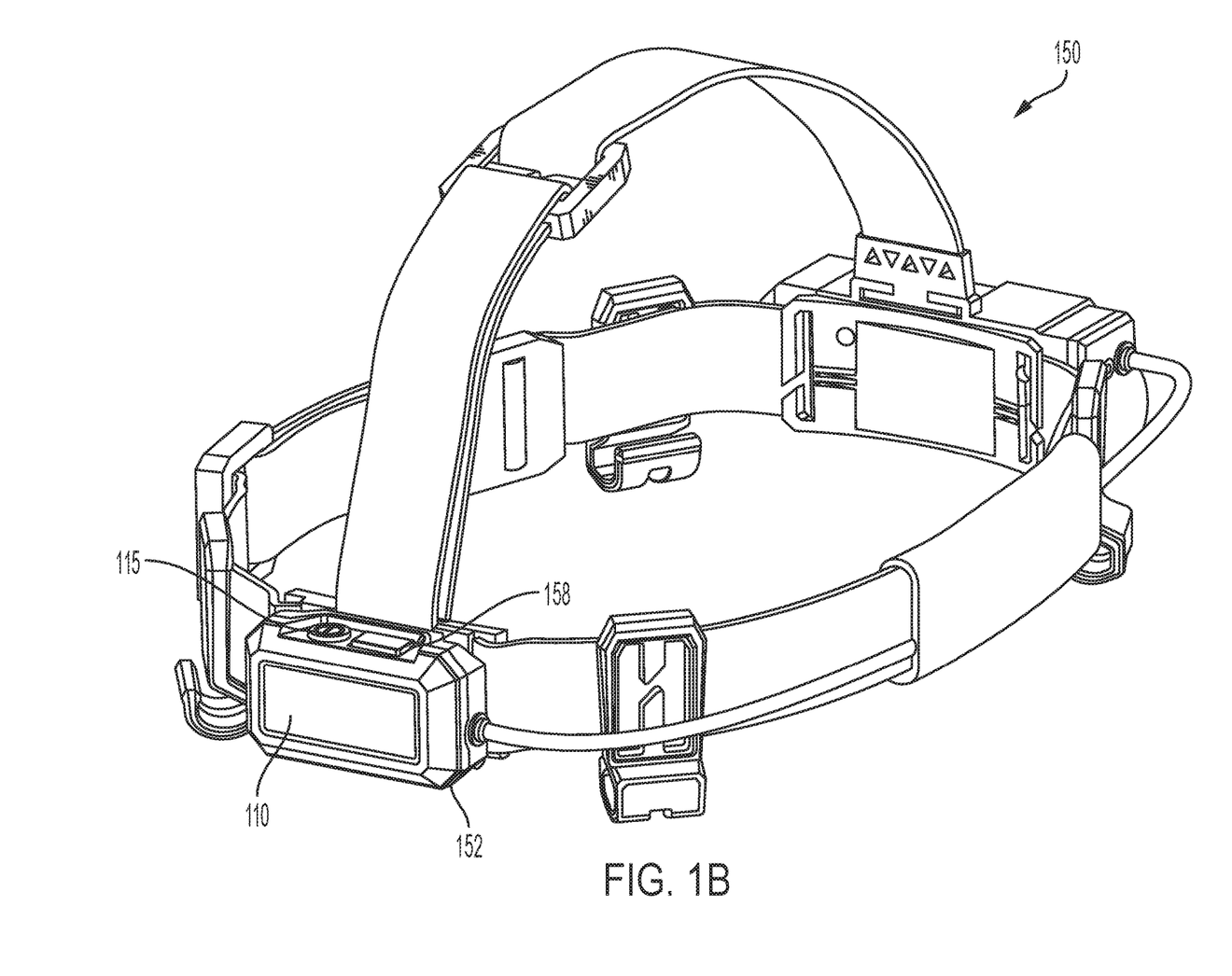
FIG. 1B is a perspective view of a headlamp lighting device including a light source, according to some embodiments.

FIG. 1A illustrates a portable lighting device 100, such as a personal floodlight or flashlight, including a housing 105, a light source 110, and a power input 115. The housing 105 has a generally elongated cuboidal shape with a rectangular or square cross-section. In other embodiments, the housing 105 may be configured as other geometric shapes. The housing 105 supports and encloses the other components of the lighting device 100. FIG. 1B shows a different embodiment of the portable lighting device 100, as a headlamp having a housing 105, a light source 110, a power input 115, and a mode input 120. The above embodiments described in FIGS. 1A and 1B are for example purposes only, and it is contemplated that other portable lighting device types may be used to effectuate the below processes. Other example portable lighting device types can include headlamps, flashlights, flood lights, tower lights, site lights, temporary lights, etc.

In some embodiments, the light sources 110 may include one or more light emitting elements. In one embodiment, the light emitting elements are light emitting diodes (LEDs). The light sources 110 may include various numbers of LEDs. For example, the light sources 110 may include 1, 2, 4, or any other number of LEDs. For example, in some embodiments, the lighting device 100 may be a personal flashlight that only includes one LED. In other embodiments, the lighting device 100 may be a tower light that includes 50 or more LEDs. In the present embodiments, the LEDs are driven in synchronism with a relatively constant current or voltage. In other embodiments, the LEDs may be driven separately and with a variable current or voltage.

Figure 2:
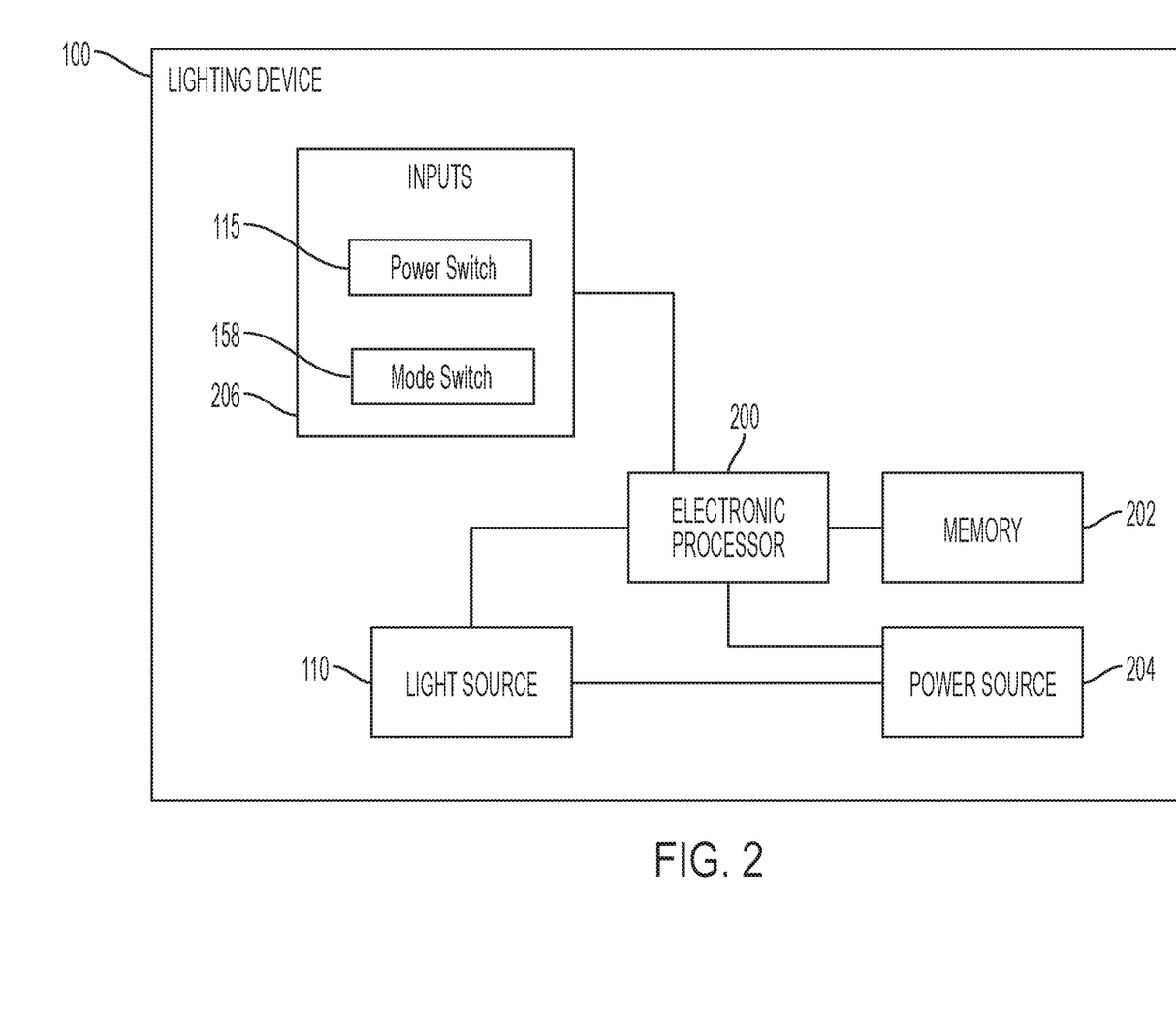
FIG. 2 is a block diagram of a lighting device, according to some embodiments.

Turning now to FIG. 2, a block diagram of the lighting device 100 is shown, according to one embodiment. As shown in FIG. 2, the lighting device 100 includes an electronic processor 200, a memory 202, a power source 204, the light source 110, and one or more inputs 206. The electronic processor 200 is electrically coupled to a variety of components of the lighting device 100 and includes electrical and electronic components that provide power, operational control, and protection to the components of the lighting device 100. In some embodiments, the electronic processor 200 includes, among other things, a processing unit (e.g., a microprocessor, a microcontroller, or another suitable programmable device), a memory, input units, and output units. The processing unit of the electronic processor 200 may include, among other things, a control unit, an arithmetic logic unit ("ALU"), and registers. In some embodiments, the electronic processor 200 may be implemented as a programmable microprocessor, an application specific integrated circuit ("ASIC"), one or more field programmable gate arrays ("FPGA"), a group of processing components, or with other suitable electronic processing components.

In some embodiments, the electronic processor 200 may include a memory 202 (for example, a non-transitory, computer-readable medium) that includes one or more devices (for example, RAM, ROM, Flash memory, hard disk storage, etc.) for storing data and/or computer code for completing or facilitating the various processes, layers, and modules described herein. The memory 202 may include database components, object code components, script components, or other types of code and information for supporting the various activities and information structures described in the present application. The electronic processor 200 is configured to retrieve from the memory 202 and execute, among other things, instructions related to the control processes, algorithms, and methods described herein. The electronic processor 200 is also configured to store information on the memory 202.

In some embodiments, the power source 204 is coupled to and transmits power to the electronic processor 200 and to the light source 110. The power source 204 may include one or more batteries, such as alkaline batteries, a power tool battery, or a dedicated battery. The batteries may be removable and/or rechargeable. In some examples, the power source 204 includes other power storage devices, such as super-capacitors or ultra-capacitors. In some embodiments, the power source 204 includes combinations of active and passive components (e.g., voltage step-down controllers, voltage converters, rectifiers, filters, etc.) to regulate or control the power provided to the electronic processor 200 and/or the light source 110. In some embodiments, the power source 204 is configured to provide a drive current to the light source 110 based on control signals received from the electronic processor 200 to control an intensity of the light source 110. In other words, an intensity of the light source 110 is dependent on the drive current (i.e., power) received from the power source 204. In some embodiments, the electronic processor 200 is configured to control the drive current provided by the power source 204 to the light source 110 by controlling a pulse width modulation ("PWM") duty cycle that controls when the power source 204 provides the drive current to the light source 110.

In one example, the electronic processor 200 is configured to detect a user actuation of one or more of the inputs 206, such as the power input 115 and/or the mode input 120, by detecting a change in the state of the inputs 206. Based on the detected user actuation, the electronic processor 200 determines an operational mode for the light source 110 (for example, a high current operation mode, a low current operation mode, an off mode, or the like). In some embodiments, the lighting device 100 may only have a power input 115. The power switch may be a temporary push button, a slider switch, a rotating knob, etc. Accordingly, in such embodiments, the power input 115 may provide both ON/OFF inputs, as well as allow a user to select a mode. For example, a user may actuate the power switch a certain number of times to switch the mode of the lighting device 100. In one embodiment, the user may quickly actuate and release the power switch to change modes (e.g., HIGH mode, MED mode, and LOW mode), and actuate and hold the power input 115 to power the lighting device 100 ON or OFF. Similarly, where the lighting device 100 includes a mode input 120, actuations of the mode switch can indicate a desired mode. For example, the user may actuate the mode input 120, which cycles through the available modes of the lighting device 100. Based on the selected mode, the electronic processor 200 then controls the power source 204 to provide a drive current to the light source 110 that corresponds to the selected operational mode. In some embodiments, the lighting device 100 may include a separate actuator to select each mode.

In some embodiments, one or more of the components shown in FIG. 2 may be located on a PCB. In some embodiments, one or more of the components shown in FIG. 2 may be located elsewhere within or on the housing 105 of the lighting device 100. In some embodiments, the lighting device 100 includes additional, fewer, or different components than the components shown in FIG. 2. For example, the lighting device 100 may additionally include a display to indicate an operational mode of the lighting device 100. As another example, the lighting device 100 may include current and/or voltage sensors that measure the current being drawn by the light source 110 (i.e., drive current) and/or the voltage of the power source 204.

In some embodiments, the electronic processor 200 generates a pulse width modulated ("PWM") signal that drives the light source 110. While not shown, in some embodiments, the electronic processor 200 may be in communication with a drive circuit that generates the PWM signal that drives the light source 110. In one embodiment, the electronic processor 200 is operable to vary the PWM duty cycle to adjust the intensities of the light source 110 depending on the operation mode (e.g., HIGH mode, MED mode, LOW mode, etc.) selected by the user via the inputs 206. In other embodiments, the electronic processor 200 or other suitable circuitry may generate different types of signals or drive currents to power the light source 110 in different modes. In some embodiments, the electronic processor 200 is operable to implement ramp down operation, which allows for the output of the lighting device 100 to be gradually reduced such that a user does not perceive the change in the output. By ramping down the light source 110 of the lighting device 100, the life of the light emitting elements can be extended, due to the reduced heat generated by the light emitting elements. Further, by reducing the output of the light source 110 of the lighting device 100, the power is further reduced, thereby extending the life of the power source 204, where the power source 204 is a stored energy (e.g. battery) power source. Details of the ramp down process will be described in more detail below.

In some embodiments, the power source 204 comprises one or more lithium ion battery packs. In one example, the power source 204 comprises 18V lithium ion battery packs. However, lithium ion battery packs of more than 18V or less than 18V are also considered. In other embodiments, the power source 204 may be other energy storage devices, such as alkaline batteries, lead acid batteries, nickel metal hydride batteries, etc. In still further embodiments, the power source 204 may be an AC power source, such as provided by a utility.

Figure 3:
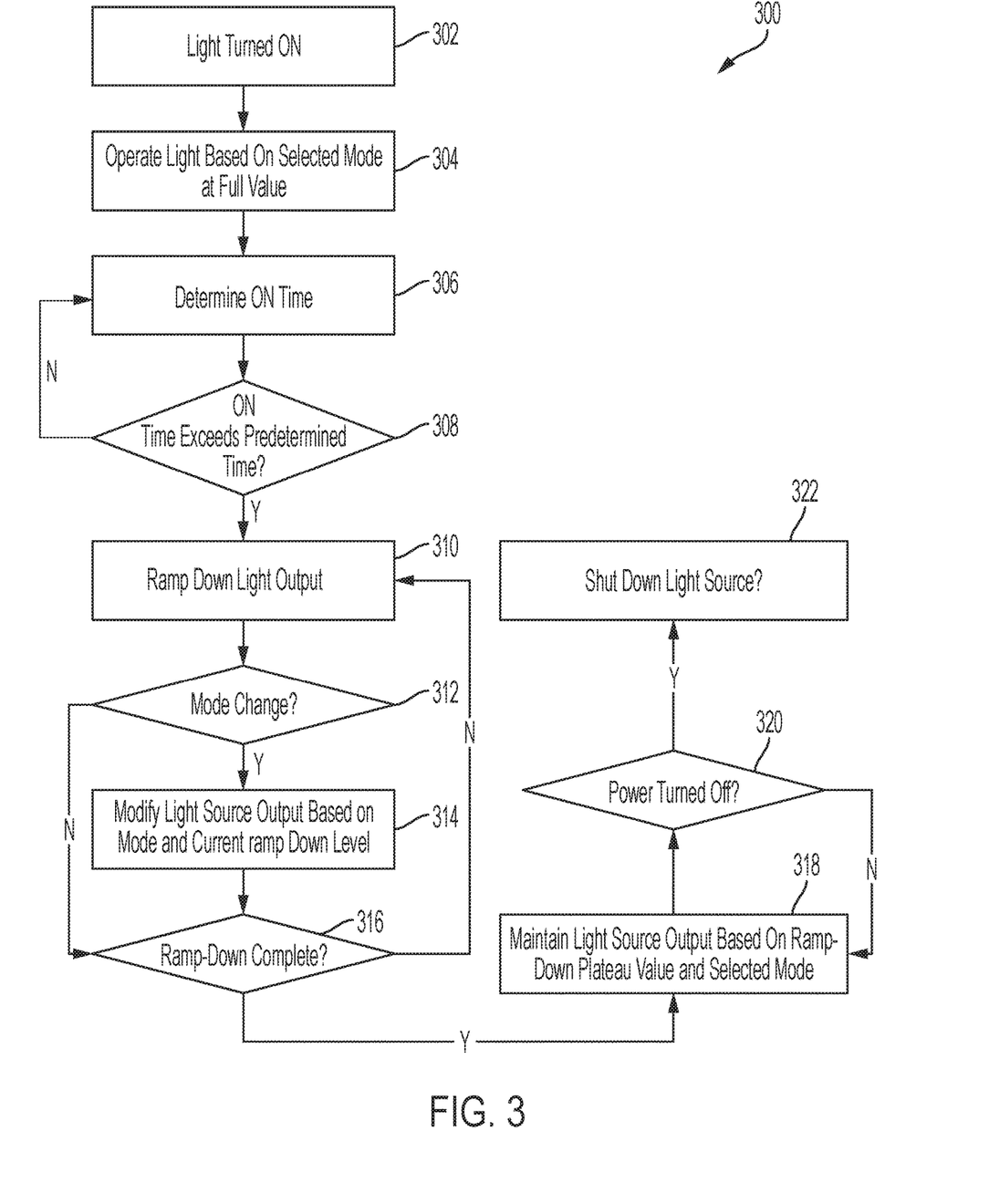
FIG. 3 is a flowchart for a ramp-down operation of a lighting device, according to some embodiments.

Turning now to FIG. 3, a flowchart illustrating a process 300 for ramping down a light source, such as the light source 110 described above, is shown, according to some embodiments. The process 300 may be executed using the lighting device 100. At process block 302, the light source 110 is turned on, such as by a user actuating the power input 115. In some embodiments, the actuation of the power input 115, and/or the actuation of the power input 115 in combination with the mode input 120 may provide the electronic processor 200 with a desired operating mode. At process block 304, the electronic processor 200 operates the light source 110 based on the user selected mode at a full output level associated with the selected mode. For example, if the user selected a HIGH mode, the electronic processor 200 will operate the light source 110 at the full output level associated with the HIGH mode. Similarly, if the user selects a MED mode or LOW mode, the electronic processor 200 will operate the light source 110 at the full output level associated with each respective mode.

At process block 306 the electronic processor 200 determines an ON time of the light source 110. In some embodiments, the electronic processor 200 is configured to start a timer as soon as the light is turned on at full value at the selected mode, as described above. At process block 308, the electronic processor 200 determines if the ON time exceeds a predetermined time value. In one embodiment, the predetermined time period may be 10 seconds. However, predetermined time values of more than 10 seconds or less than 10 seconds are also contemplated. In response to the electronic processor 200 determining that the ON time has not exceeded the predetermined time, the electronic processor 200 continues to determine the ON time of the light source 110 at process block 306. In response to determining that the ON time has exceeded the predetermined time, the electronic processor 200 initiates a ramp-down algorithm to reduce the output of the light source 110 at process block 310.

In one embodiment, the ramp-down algorithm may be implemented by the electronic processor 200 to slowly decrease the drive current and the corresponding lumen output of the light source 110 according to a function of time. In other embodiments, the electronic processor 200 decreases the drive current and the corresponding lumen output of the light source 110 as a function of remaining charge in the power source 204 or a function of both time and remaining charge. In one embodiment, the electronic processor 200 decreases the drive current by reducing the percentage of the PWM duty cycle provided to the light source 110. In one embodiment, the ramp-down algorithm instructs the electronic processor 200 to decrease drive current to the light source 110 until a specific "plateau" threshold is reached, after which the drive current is held constant by the electronic processor 200. In some embodiments, the ramp-down algorithm is implemented by the electronic processor 200 to incrementally decrease the drive current in a predetermine number of steps or as a continuous function with zero or infinite number of steps. In some embodiments, the ramp-down algorithm may use linear slopes, mathematical functions, or look up tables to determine the ramp. Other methods of implementing the ramp-down algorithm based on factors other than time are possible to achieve the same purpose and are not exhaustively detailed herein.

At process block 312 the electronic processor 200 determines if the user has initiated a mode change. For example, the user may switch from a first mode to a second mode or a third mode, etc. In response to the electronic processor 200 determining that the user has initiated a mode change, the electronic processor 200 modifies the light source 110 output based on the selected mode, and the current ramp-down status level at process block 314. For example, if the mode change is from the first mode to the second mode, the electronic processor 200 reduces the output of the light source 110 to the second mode output further reduced by a ramped-down amount substantially equivalent to the ramped-down level of the light source 110 prior to the mode change.

Figure 4:
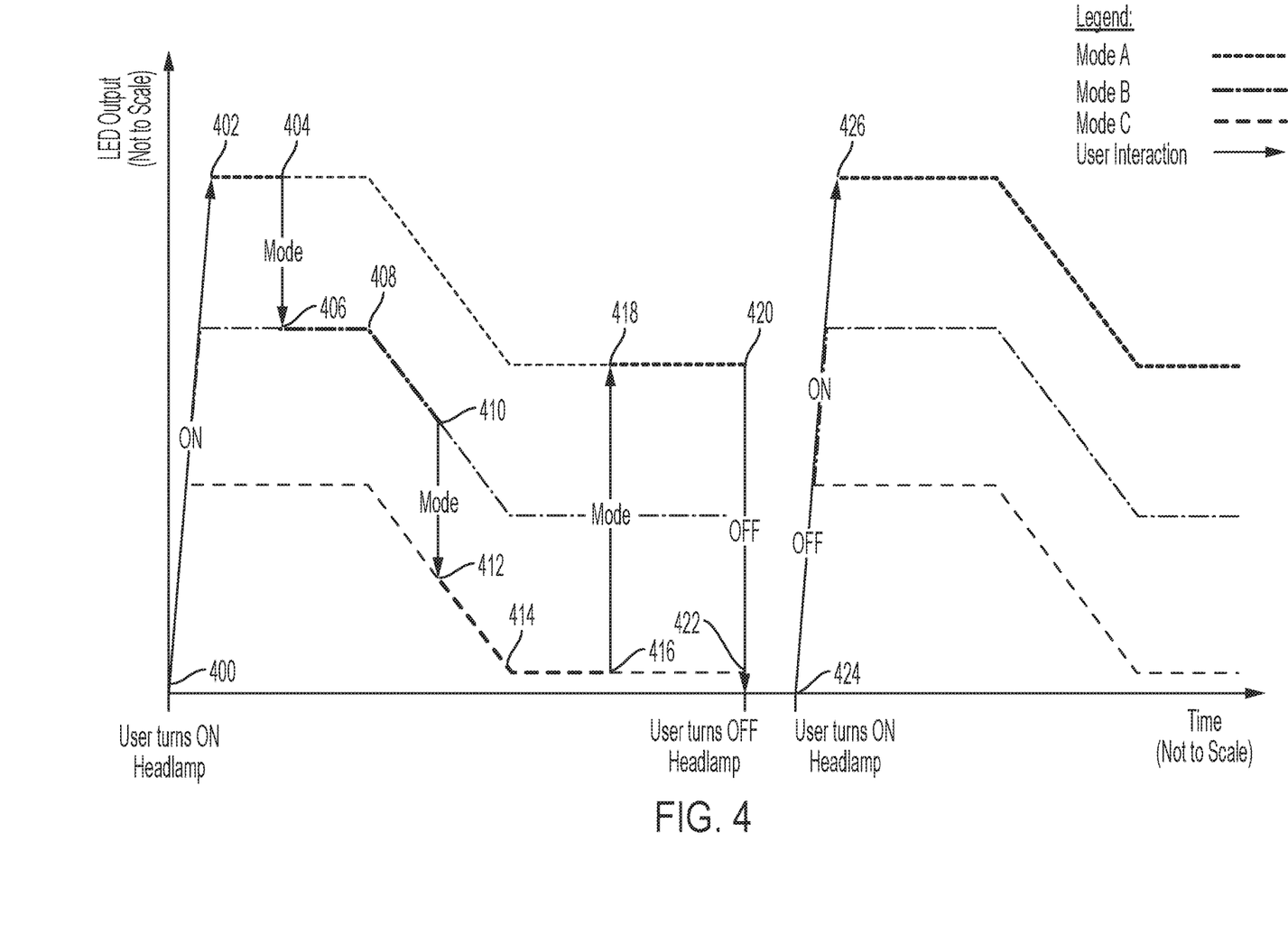
FIG. 4 is a graph of a light output during execution of the ramp-down algorithm of FIG. 3, according to some embodiments.

Turning briefly to FIG. 4, a chart illustrating an output of a light source, such as light source 110, executing the process 300 described above, is shown according to some embodiments. At data point 400, the user turns on a light source at a first mode (shown in FIG. 4 as Mode A). In one embodiment, the first mode is a HIGH output mode. In other embodiments, the first mode is an operational mode, such as a hybrid mode (e.g. flood and spot light), a spot high mode, a spot low mode, a flood high mode, or a flood low mode. After a short ramp-up time, the light source output is at a full value of the first mode at data point 402. At data point 404, the user changes from the first mode to a second mode (shown in FIG. 4 as Mode B). As shown in FIG. 4, the second mode is associated with a lower output intensity than the first mode. In one embodiment, the second mode is a MEDIUM output mode. In other embodiments, the second is an operational mode, such as a hybrid mode (e.g. flood and spot light), a spot high mode, a spot low mode, a flood high mode, or a flood low mode. In one embodiment, the second mode has a lower output intensity than the first mode. As a ramp-down process has not yet occurred, upon the user changing modes from the first mode to the second mode, the electronic processor 200 modifies the output of the light source 110 to the full power output associated with the second mode at data point 406. At data point 408, the electronic processor 200 begins to ramp-down the output of the light source 110 from the second mode, as described with regards to FIG. 3, above. During the ramp-down, at data point 410 the user again changes the mode. This time from the second mode to a third mode (shown in FIG. 4 as Mode C). As shown in FIG. 4, the third mode is associated with a lower output intensity than the first mode and the second mode. In one embodiment, the third mode is a LOW output mode, as described above. In other embodiments, the third mode is an operational mode, such as a hybrid mode (e.g. flood and spot light), a spot high mode, a spot low mode, a flood high mode, or a flood low mode. In one embodiment, the third mode has a lower output intensity than the second mode. Upon receiving the mode changes, the electronic processor 200 reduces the output of the light source 110 to a level on the third mode ramp-down ramp that is equal to the position of the second mode ramp, as shown at data point 412. Thus, the ramp-down continues from data point 412, and does not reset when the mode is changed. The electronic processor 200 continues to ramp down the output of the light source 110 in the third mode until the plateau position is reached at data point 414, at which point the light source 110 output remains constant until a subsequent user action occurs. For example, at data point 416, the user again changes the mode to the first mode. At data point 418, the electronic processor 200 increases the output of the light source 110 to the plateau position for the first position, as shown.

Returning now to FIG. 3, upon modifying the light source 110 in process block 314, the electronic processor 200 determines if the ramp-down is complete at process block 316. Similarly, in response to the electronic processor 200 determining that a user has not initiated a mode change, the electronic processor 200 determines if the ramp-down is complete at process block 316. As described above, the ramp-down may be completed when the output of the light source 110 reaches a predefined plateau level. In one embodiment, the plateau level is 50% of the full output level of a given mode. However, plateau levels of more than 50% or less than 50% of a given mode are also contemplated. In response to the electronic processor 200 determining that the ramp-down is not complete at process block 316, the electronic processor 200 continues to ramp down the output of the light source 110 at process block 310.

In response to determining that the ramp-down is completed, the electronic processor 200 is configured to maintain the light source output based on the ramp-down plateau value and the selected mode at process block 318. This applies even if the mode is changed after the output has reached the plateau value, as described in regards to FIG. 4, above. The electronic processor 200 then determines if the power has been turned off at process block 320. If the electronic processor 200 determines that the power has not been turned off at process block 320, the electronic processor 200 continues to maintain the light source output based on the ramp-down plateau value and the selected mode. If the electronic processor 200 determines that the power has been turned off, the light source 110 is shut down at process block 322, and the process will start over again at process block 320 upon the light being turned on. This can again be seen in FIG. 4. For example, at data point 420, the user turns the light source 110 OFF, and the electronic processor 200 turns off the power to the light source 110 at data point 422. At data point 424, the user turns on the light source 110 in the first mode, at which point the electronic processor 200 turns the light source 110 to the full first mode value at data point 426, and the process resets as described above. In some embodiments, the operating mode (e.g. first mode, second mode, third mode) used by the light source 110 prior to the user turning the light source 110 OFF is stored in the memory 202. The electronic processor 200 may be configured to access the previous stored operating mode when the light source 110 is turned back on by a user and operate the light source 110 at the full value associated with the stored operating mode.

Figure 5:
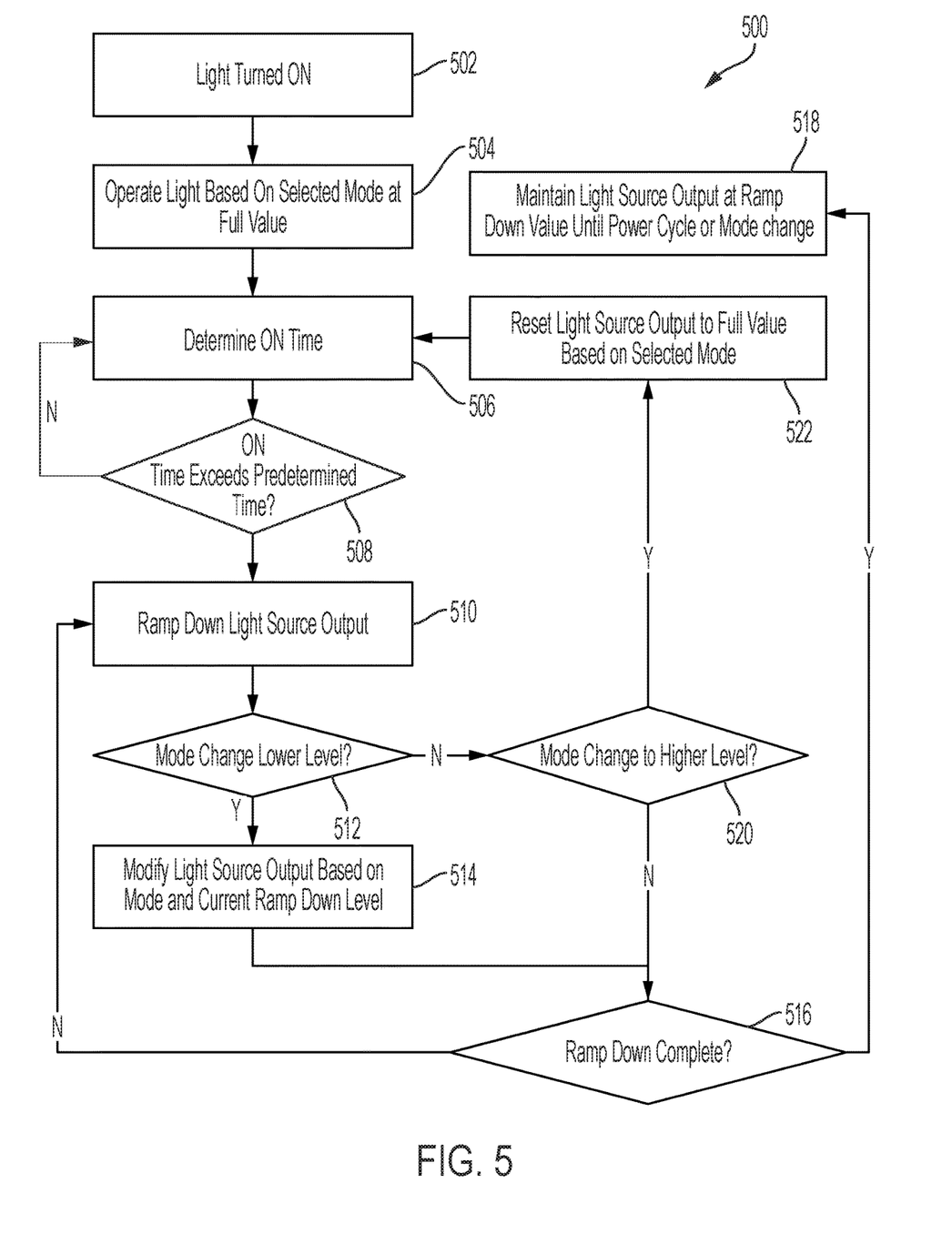
FIG. 5 is a flow chart illustrating an alternative ramp-down operation of a lighting device, according to some embodiments.

Turning now to FIG. 5, an alternative process 500 for performing a ramp-down of a light source, such as light source 110 described above, is shown, according to some embodiments. At process block 502, the light source 110 is turned on, such as by a user actuating the power input 115. In some embodiments, the actuation of the power input 115, and/or the actuation of the power input 115 in combination with the mode input 120 may provide the electronic processor 200 with a desired operating mode. At process block 504, the electronic processor 200 operates the light source 110 based on the user selected mode at a full output level associated with the selected mode. For example, if the user selected a first mode (e.g. Mode A), the electronic processor 200 will operate the light source 110 at the full output level associated with the first mode. Similarly, if the user selects a second mode (e.g. Mode B) or third mode (e.g. Mode C), the electronic processor 200 will operate the light source 110 at the full output level associated with each respective mode. The first, second, and third modes may be equivalent to the first, second, and third modes described in regards to FIG. 4.

At process block 506, the electronic processor 200 determines an ON time of the light source 110. In some embodiments, the electronic processor 200 is configured to start a timer as soon as the light is turned on at full value at the selected mode, as described above. At process block 508, the electronic processor 200 determines if the ON time exceeds a predetermined time value. In one embodiment, the predetermined time period may be 10 seconds. However, it is contemplated that other predetermined time values of more than 10 seconds or less than 10 seconds are also contemplated. In response to the electronic processor 200 determining that the ON time has not exceeded the predetermined time, the electronic processor 200 continues to determine the ON time of the light source 110 at process block 506. In response to determining that the ON time has exceeded the predetermined time, the electronic processor 200 initiates a ramp-down algorithm to reduce the output of the light source 110 at process block 510. In one embodiment, the ramp-down algorithm is similar to the ramp-down algorithm described above.

At process block 512 the electronic processor 200 determines if the user has initiated a mode change to a lower level (e.g. from the first mode to the second or third mode; the second mode to the third mode, etc.). Based on the electronic processor 200 determining that the mode was changed to a lower level at process block 512, the electronic processor 200 modifies the light source output based on the selected mode, and the current ramp down status level at process block 514. For example, if the mode changes from the first mode to the second mode, the electronic processor 200 reduces the output of the light source 110 to the second mode output further reduced by a ramped-down amount substantially equivalent to the ramped-down level of the light source 110 in the first mode prior to the mode change. For example, if the ramp down in the first mode had reduced the light output by 20% of the normal first mode at the time of the mode switch, the electronic processor 200 would operate the light source 110 at the 20% ramp down point of the second mode. The electronic processor 200 then determines if the ramp-down is complete at process block 516. As described above, the ramp-down may be completed when the output of the light source 110 reaches a predefined plateau level. In response to the electronic processor 200 determining that the ramp-down is not complete at process block 516, the electronic processor 200 continues to ramp down the output of the light source 110 at process block 510. In response to the electronic processor 200 determining that the ramp-down is completed, the electronic processor 200 maintains the light source 110 output until a power cycle or mode change occurs, at process block 518.

In response to the electronic processor 200 determining that the mode change was not made to a lower level, the electronic processor 200 then determines if the mode change was to a higher level at process block 520. In response to the electronic processor 200 determining that the mode was changed to a higher level (e.g. from the third mode to either the second mode or the first mode), the electronic processor 200 is configured to reset the light source 110 output to the full value associated with the selected mode at process block 522. Thus, when the mode is changed to a higher level, the electronic processor 200 resets the ramp-down values and begins operation of the light source 110 at the full output value for the higher mode. The electronic processor 200 resumes monitoring an ON time for the light at process block 506. In response to the electronic processor 200 determining that the mode was not changed to a higher level, the electronic processor 200 determines if the ramp-down is complete at process block 516.

Figure 6:
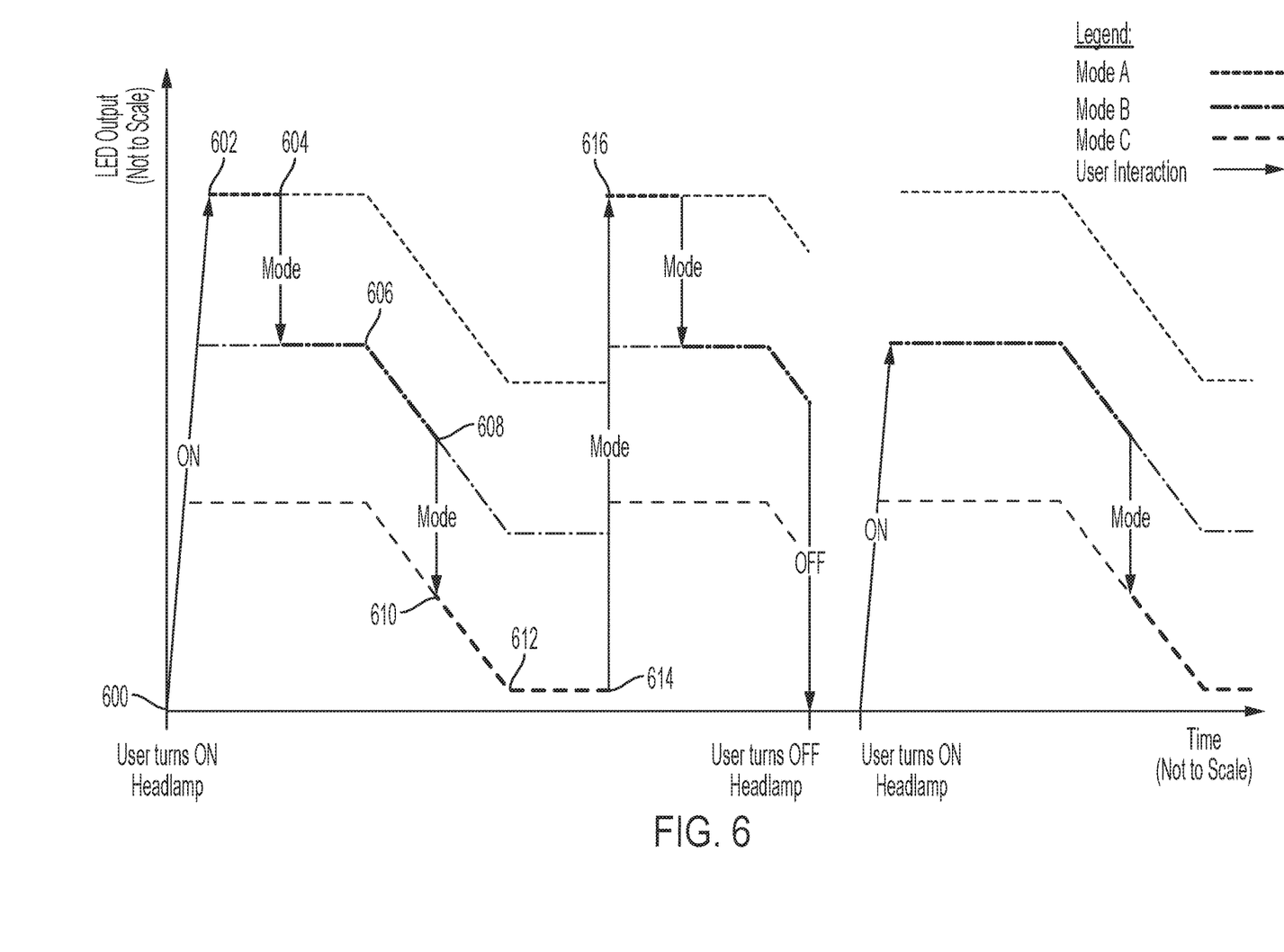
FIG. 6 is a graph of light output during execution of the ramp-down algorithm of FIG. 5, according to some embodiments.

Turning now to FIG. 6, a chart illustrating an output of a light source, such as light source 110, executing the process 500 described above, is shown according to some embodiments. At data point 600 the user turns on the light source 110 to the first mode (shown in FIG. 6 as Mode A). In one embodiment, the first mode is a HIGH output mode. In other embodiments, the first mode is an operational mode, such as a hybrid mode (e.g. flood and spot light), spot high, spot low, flood high, or flood low. After a brief ramp up, the electronic processor 200 controls the light source 110 to output light at the full value of the first mode at data point 602. At data point 604, the user changes from the first mode to a second mode (shown in FIG. 4 as Mode B), and the electronic processor 200 changes the output of the light source 110 to the full second mode output value, as no ramp-down had occurred prior to the mode change. In one embodiment, the second mode is a MEDIUM output mode. In other embodiments, the second is an operational mode, such as a hybrid mode (e.g. flood and spot light), a spot high mode, a spot low mode, a flood high mode, or a flood low mode. In one embodiment, the second mode has a lower output intensity than the first mode. At data point 606, the electronic processor 200 begins the ramp down of the light source 110 as described above. At data point 608, the user again changes modes from the second mode to a third mode (shown in FIG. 6 as Mode C) prior to the ramp-down being completed. In one embodiment, the third mode is a LOW output mode, as described above. In other embodiments, the third mode is an operational mode, such as a hybrid mode (e.g. flood and spot light), a spot high mode, a spot low mode, a flood high mode, or a flood low mode. In one embodiment, the third mode has a lower output intensity than the second mode. Accordingly, at data point 610, the electronic processor 200 reduces the output of the light source 110 to a level on the third mode ramp-down ramp that is equal to the position of the second mode ramp, as shown at data point 610. Thus, the ramp-down continues from data point 610, and does not reset when the mode is changed to a lower mode. The electronic processor 200 then continues to ramp down the output of the light source 110 in the third mode until the plateau position is reached at data point 612, at which point the light source 110 output remains constant until a subsequent user action occurs. For example, at data point 614, the mode is changed from the third mode to the first mode. As described above in FIG. 5, due to the mode being changed to a higher mode, the electronic processor 200 is configured to modify the output of the light source 110 to be the full value of the first mode. The electronic processor 200 then continues to operate the light according to the process 500 described above.

With continued reference to FIG. 6, when a user turns OFF the light source 110 and then turns back ON the light source 110, the output of the light source 110 may resume at whatever mode the light source 110 was in when turned OFF (e.g., the second mode). This functionality may be achieved by storing the current mode in the memory 202 when the light source 110 is turned OFF. In contrast, in some embodiments, such as the embodiment shown in FIG. 4, the light source 110 may default to the same mode (e.g., the first mode) when turned back ON, regardless of the mode the light source 110 was in when turned OFF.

Figure 7:
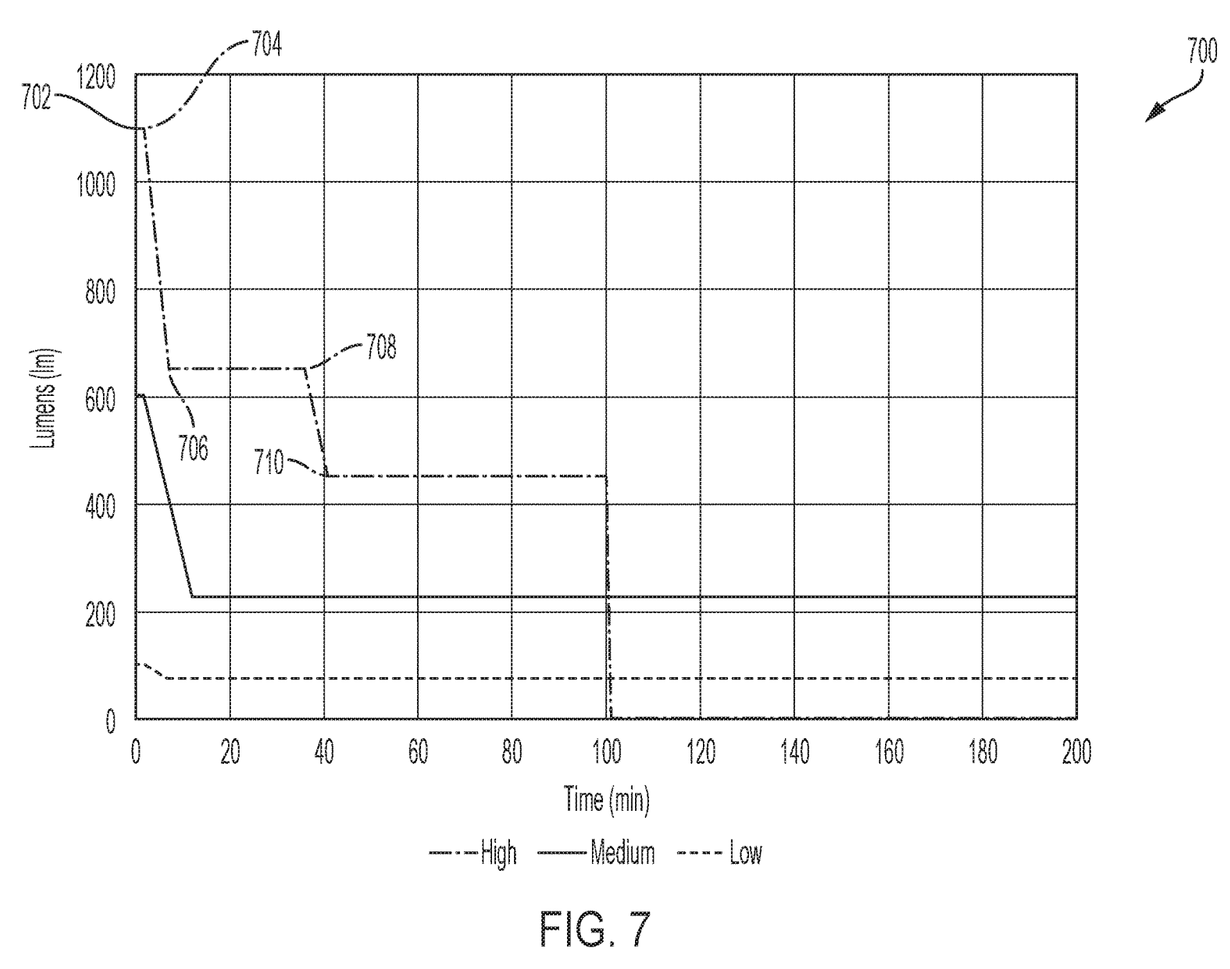
FIG. 7 is a graph of light output during execution of a dual ramp-down algorithm, according to some embodiments.

Turning now to FIG. 7, a chart illustrating a dual ramp down process 700 for a light source, such as light source 110, is shown, according to some embodiments. The ramp down process 700 shown in FIG. 7 is understood to be able to modify above described process 300 and 500. At shown, a user may turn on the light source 110 at data point 702 in a HIGH mode. At data point 704 the light source 110 begins to ramp down until it reaches data point 706. After a time is spent at the reduced output value, and with the light source 110 still in HIGH mode, a second ramp-down even occurs at data point 708. The ramp down continues until data point 710, at which point the output operates at steady state until a user powers off the light source 110, or there is a mode change, as described above in regards to processes 300 and 500. As shown in FIG. 7, the ramp down modes for MED and LOW modes may be the same as described above in processes 300 and 500. This dual ramp down process 700 can be used to aid in stabilization of temperatures of a lighting device, especially when operating in a HIGH output mode. In addition, the dual ramp process 700 can be used with the process 300 shown in FIG. 3 or the process 500 shown in FIG. 5.

In some examples, the above ramp down processes can be inverted to provide ramp-up outputs of lighting devices. For example, ramp-up processes may be desired when the power supply of a lighting device is switched, such as by the lighting device being placed on utility supplied AC power source from a local (e.g. battery supplied) DC power source. This can allow for maximum output to be provided when there is a constant power supply, and the need to maximize battery power is not a factor. It is further contemplated that other configurations may utilize ramp-up processes to ensure maximum lighting based on certain conditions being made.

Although the invention has been described in detail with reference to certain preferred embodiments, variations and modifications exist within the scope and spirit of one or more independent aspects as described. Various features and advantages are set forth in the following claims.

We claim:

1. A method for operating a light source, the method comprising:
receiving an input to illuminate the light source at a first illumination intensity value associated with a first operating mode;
operating the light source at the first illumination intensity value based on the received input;
initiating a ramp-down operation of the light source from the first illumination intensity value, wherein the ramp-down operation is configured to reduce an output of the light source as a percentage of a desired illumination intensity value over time;

receiving a first mode change input to change from the first operating mode to a second operating mode at a first time, wherein a second illumination intensity value is associated with the second operating mode;

in response to receiving the first mode change input, controlling the output of the light source to output a third illumination intensity value, wherein the third illumination intensity value is equal to the second illumination intensity value less the percentage of the first illumination intensity value at the first time; and continuing the ramp-down operation from the third illumination intensity value until the output of the light source reaches a predetermined value associated with the second operating mode.

2. The method of claim 1, wherein the ramp-down operation is further configured to:

reduce the output of the light source as a percentage of the desired illumination value over time;

determine if the output of the light source has reached a first predetermined value;

in response to determining that the output of the light source has reached the first predetermined value, maintain the output of the light source at the first predetermined value for a first time period;

determine if the first time period has elapsed; and in response to determining that the first time period has elapsed, reduce the output of the light source to a second predetermined value over time.

3. The method of claim 1, further comprising determining an operating time of the light source while operating the light source at the first illumination intensity value, wherein initiating the ramp-down operation includes initiating the ramp-down operation of the light source based on the operating time of the light source exceeding a predetermined time value.

4. The method of claim 1, wherein the second illumination intensity value is lower than the first illumination intensity value.

5. The method of claim 1, further comprising:

receiving a second mode change input to change to a third mode at a second time; and in response to receiving the second mode change input, controlling the output of the light source to output a fourth illumination intensity value, wherein the fourth illumination intensity value is equal to the second illumination intensity value less the percentage of the third illumination intensity value at the second time;

wherein the third illumination intensity value is lower than the second illumination intensity value.

6. The method of claim 1, further comprising operating the light source in the first operating mode when power to the light source is cycled.

7. The method of claim 1, further comprising operating the light source at an operating mode selected prior to a power cycling operation.

8. The method of claim 1, further comprising:

determining an intensity of the second illumination intensity value relative to the first illumination intensity value;

in response to the second illumination intensity value being determined to be a lower intensity value than the first illumination intensity value, controlling the output of the light source to output the third illumination intensity value; and in response to the second illumination intensity value being determined to be a higher intensity value than the first illumination intensity value, controlling the output of the light source to output the second illumination intensity value.

9. The method of claim 1, further comprising:

determining an intensity of the second illumination intensity value relative to the first illumination intensity value;

in response to the second illumination intensity value being determined to be a lower intensity value than the first illumination intensity value, controlling the output of the light source to output the third illumination intensity value; and in response to the second illumination intensity value being determined to be a higher intensity value than the first illumination intensity value, controlling the output of the light source to output a fourth intensity value, wherein the fourth illumination intensity value is equal to the second illumination intensity value less the percentage of the first illumination intensity value at the first time.

10. A lighting device comprising:

a light source;

one or more input devices; and an electronic processor, the electronic processor configured to:

receive an input to illuminate the light source at a first illumination intensity value associated with a first operating mode;

operate the light source at the first illumination intensity value based on the received input;

initiate a ramp-down operation of the light source from the first illumination intensity value, wherein the ramp-down operation is configured to reduce an output of the light source as a percentage of a desired illumination intensity value over time;

receive a first mode change input to change from the first operating mode to a second operating mode at a first time, wherein a second illumination intensity value is associated with the second operating mode;

in response to the first mode change input, control the output of the light source to output a third illumination intensity value, wherein the third illumination intensity value is equal to the second illumination intensity value less the percentage of the first illumination intensity value at the first time; and continuing the ramp-down operation from the third illumination intensity value until the output of the light source reaches a predetermined value associated with the second operating mode.

11. The lighting device of claim 10, wherein the electronic processor is further configured to:

determine an intensity of the second illumination intensity relative to the first illumination intensity value;

control the output of the light source to output the third illumination intensity value in response to the second illumination intensity value being determined to be a lower intensity value than the first illumination intensity value; and control the output of the light source to output the second illumination intensity value in response to the second illumination value being determined to be a higher intensity value than the first illumination intensity value.

12. The lighting device of claim 10, wherein the electronic processor is further configured to:

determine an intensity of the second illumination intensity value relative to the first illumination intensity value;

control the output of the light source to output the third illumination intensity value in response to the second illumination intensity value being determined to be a lower intensity value than the first illumination intensity value; and control the output of the light source to output a fourth illumination intensity value in response to the second illumination value being determined to be a higher intensity value than the first illumination intensity value, wherein the fourth illumination intensity value is equal to the second illumination intensity value less the percentage of the first illumination intensity value at the first time.

13. The lighting device of claim 10, wherein the electronic processor is configured to continue the ramp-down operation from the third illumination value until the ramp-down operation is complete.

14. The lighting device of claim 13, wherein the ramp-down operation is complete when the ramp-down operation reaches a predetermined value.

15. The lighting device of claim 10, wherein the electronic processor is further configured to operate the light source at the second operating mode of the light source immediately prior to a power cycling operation.

16. A lighting device comprising:
a light source;
one or more input devices; and
an electronic processor, the electronic processor configured to:
receive an input from the one or more input devices to illuminate the light source at a first illumination intensity value associated with a first operating mode;
control the light source to output light at the first illumination intensity value based on the received input;
determine an operating time of the light source;
initiate a ramp-down operation of the light source based on the operating time of the light source being determined to exceed a predetermined time value, wherein the ramp-down operation is configured to reduce an output of the light source as a percentage of a desired illumination intensity value over time;
receive a first mode change input to change from the first operating mode to a second operating mode at a first time, wherein the first time is during the ramp-down operation, wherein a second illumination intensity value is associated with the second operating mode, and wherein the second illumination intensity value is less than the first illumination intensity value;
control the output of the light source to output a third illumination intensity value, wherein the third illumination intensity value is equal to the second illumination intensity value less the percentage of the first illumination intensity value at the first time; and
continuing the ramp-down operation from the third illumination intensity value until the output of the light source reaches a predetermined value associated with the second operating mode.

17. The lighting device of claim 16, wherein the electronic processor is further configured to:
receive a second mode change input to change from the second operating mode to a third operating mode at a second time, wherein a fourth illumination intensity value is associated with the third operating mode.

18. The lighting device of claim 17, wherein the fourth illumination intensity value is a higher intensity value than the second illumination intensity value, and wherein the electronic processor is further configured to:
control the output of the light source to output a fifth illumination intensity value, wherein the fifth illumination intensity value is equal to the fourth illumination intensity value less a percentage of the second illumination intensity value at the second time.

19. The lighting device of claim 17, wherein the fourth illumination intensity value is a higher intensity value than the second illumination intensity value, and wherein the electronic processor is further configured to:
control the output of the light source to output the fourth illumination intensity value.

* * * * *